United States Patent [19]
Mikel et al.

[11] Patent Number: 5,094,117
[45] Date of Patent: Mar. 10, 1992

[54] INFINITELY ADJUSTABLE BOLT LOCKING PLATE

[75] Inventors: Steven A. Mikel, Farmington Hills; Hunter Oden, Rochester Hills, both of Mich.

[73] Assignee: Chrysler Corporation, Highland Park, Mich.

[21] Appl. No.: 633,850

[22] Filed: Dec. 26, 1990

[51] Int. Cl.$^5$ .............................................. F16H 35/06
[52] U.S. Cl. ........................................ 74/395; 74/405; 403/258; 474/903
[58] Field of Search ..................... 74/405, 395, 434; 403/258, 260, 320; 474/903

[56] References Cited

U.S. PATENT DOCUMENTS

| | | | |
|---|---|---|---|
| 3,490,303 | 1/1970 | Rosenberg | 74/395 |
| 3,866,485 | 2/1975 | Blatt | 74/422 |

FOREIGN PATENT DOCUMENTS

| | | | |
|---|---|---|---|
| 716302 | 8/1965 | Canada | 474/904 |

Primary Examiner—Leslie A. Braun
Assistant Examiner—Ryan W. Massey
Attorney, Agent, or Firm—Edward P. Barthel

[57] ABSTRACT

In the preferred form a locking plate comprises a small rigid sheet of metal having a longitudinal axis of symmetry along which a generally rectangular central aperture extends. The central aperture has transversely opposed internal side edges and longitudinally opposed arcuate end edges. The central aperture defines a pair of spaced apart longitudinal side straps bent upwardly from the plane of the locking plate and a pair of spaced apart transverse arcuate end bases. Each base plate is formed with an arcuate slot with the slots having a common center of curvature located at the axis midpoint and subtending a predetermined central angle. The central aperture internal side edges juxtaposed diametrically opposite side flanks of the hex-head enabling a fastener to be received in each arcuate slot and an underlying one of a pair of diametrically opposed threaded bores so as to lock the hex-head in its tightened position.

3 Claims, 1 Drawing Sheet

INFINITELY ADJUSTABLE BOLT LOCKING PLATE

BACKGROUND OF THE INVENTION

This invention relates to locking washers used with threaded fasteners and more particularly to a one-piece infinitely adjustable bolt locking plate for a hex-head bolt or nut.

The prior art is replete with lock washers which are adapted to be secured against rotation relative to a work piece. The U.S. Pat. No. 1,916,526 issued July 4, 1933 to Olson discloses a lock washer having a plurality of locking prongs associated with an annular body portion which interlocks with the workpiece to counteract any tendency for the washer to rotate with respect to the workpiece when a nut is rotatively clamped thereagainst.

SUMMARY OF THE INVENTION

It is an object of the present invention to provide a one piece locking plate for a hex-head bolt or nut that is infinitely adjustable.

It is another object of the present invention to provide a one-piece locking plate as set forth above which is inexpensive to fabricate and which is adapted for ready attachment to a transmission gear face upon engagement by a pair of diametrically opposed threaded fasteners.

DESCRIPTION OF THE DRAWINGS

These and other features, objects and advantages of the invention will become apparent upon consideration of the specification and appended claims in which:

DETAILED DESCRIPTION OF THE INVENTION

Figure 2:
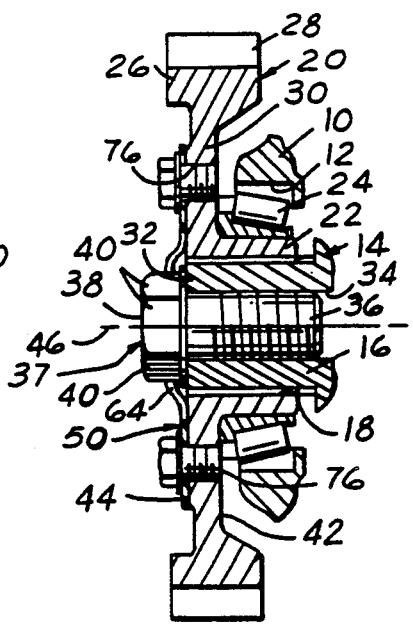
FIG. 2 is a fragmentary vertical sectional view taken on the line 2—2 of FIG. 1.
Figure 3:
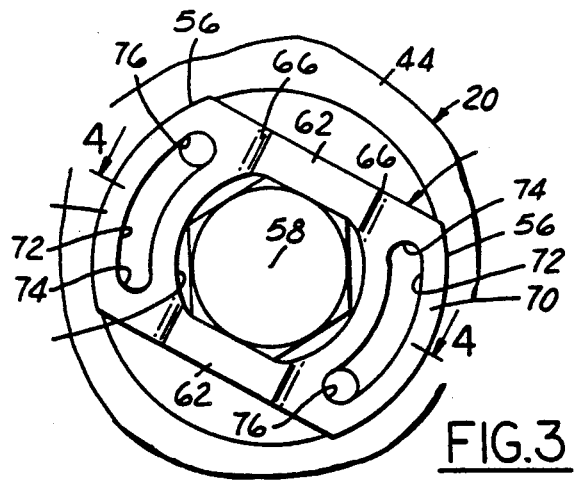
FIG. 3 is a fragmentary plane view similar to FIG. 1 showing the locking retainer secured into the bolt torqued to a different position.

Turning now to the drawings, FIG. 2 shows a transmission housing, partially indicated at 10, formed with a circular opening 12 at one end thereof. The opening 12 is sized to concentrically receive therethrough the output end of a transmission drive shaft 14. A reduced diameter end portion 16 of the drive shaft 14 has external splines engaged with internal splines formed in central axial bore 18 of a transmission drive gear, generally indicated at 20. The drive gear 20 is formed with a central hub 22 journally supported in the transmission end opening 12 by a roller bearing unit 24.

Figure 1:
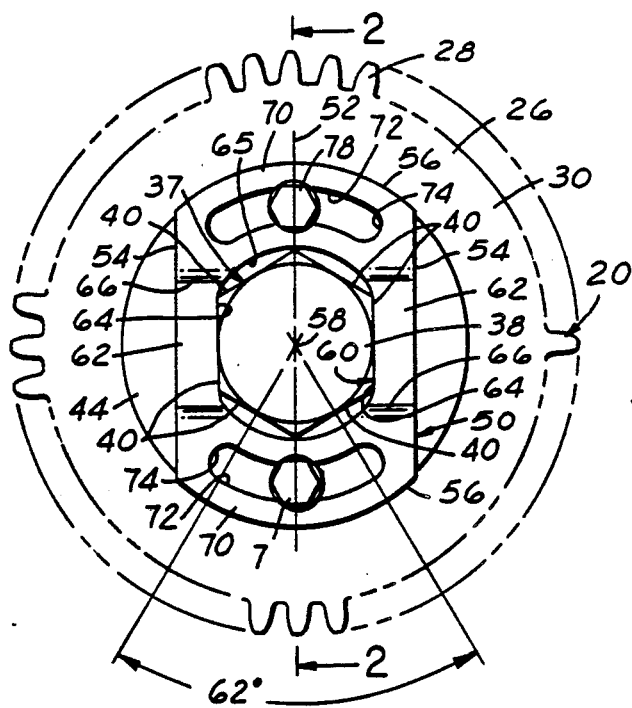
FIG. 1 is a plan view of a transmission gear showing the locking retainer securing a bolt on the end of a shaft journally supported in a transmission housing.

As seen in FIGS. 1 and 2, the drive gear 20 includes an outer rim 26, formed with gear teeth 28, with the rim joined to the central hub by intermediate web 30. The shaft one end thereof 32 has a central internally threaded bore 34 adapted to receive threaded shank 36 of a bolt 37 having a conventional hex-head 38 defining six wrench-engagable vertical side surfaces 40. It will be noted the gear hub 22 extends axially from one inner face 42 of the gear web while outer face 44 of the gear web is substantially flush with the shaft one end 32. Upon the blot 38 being threadably inserted in the shaft axial bore 34 and torqued down, the drive gear 20 is fixedly retained on the transmission shaft 14 for rotation therewith about the principal axis 46 of the shaft.

The present invention provides a locking retainer plate, generally indicated at 50 in FIGS. 1 and 2, to insure that the bolt 38 cannot become loosened by vibration, centrifugal force, etc. As seen in FIG. 1, the retainer plate, which is preferably stamped from sheet material such as rigid sheet steel, is a planar generally rectangular-shaped plate having a major longitudinal axis of symmetry 52. The retainer plate 50 is defined by parallel outer side edges 54 and arcuate fore and aft mirror image end edges 56 the radius of each having a common center of curvature 58 located at the midpoint of the major longitudinal axis 52.

Figure 4:
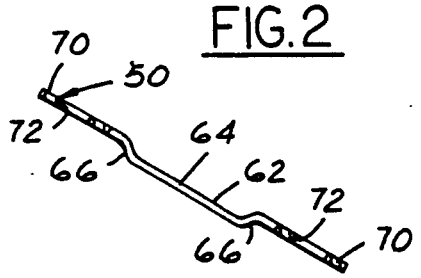
FIG. 4 is a detail cross sectional view of the locking retainer taken on the line 4—4 of FIG. 3.

The retainer plate 50 is tamped with a central elongated aperture 60 extending parallel to the longitudinal axis 52. The central aperture defines two parallel pairs of longitudinal side straps 62 transversely spaced apart and, as best seen in FIG. 4, bent upwardly a predetermined dimension from the plane of the retainer plate 50. The central aperture 60 is defined by longitudinally extending opposed internal side edges 64 and transverse opposed arcuate end edges 65. It will be noted that each aperture internal side edge is substantially coextensive with its associated strap which strap extends longitudinally between each strap pair of sloped riser portions 66.

The central aperture opposed arcuate internal end edges 65 define, with their associated retainer plate outer end edges 56 longitudinally spaced apart pairs of arcuate-shaped bases 70. Each end base is formed with an arcuate slot 72 having curved ends 74 matching the curvature of each of a pair of diametrically opposed mirror image web bores 72 in its outer face 44. As seen in FIG. 1, each base slot 72 has a common center of curvature located at the midpoint 58 and subtends a central angle of curvature "X" equal to substantially 62 degrees. Further, each of the base slots has a predetermined radial width substantially equal to but slightly greater than the diameter of the web bores 76.

The central aperture 60 internal side edges 64 are spaced a predetermined transverse dimension apart substantially equal to but slightly greater than the dimension between hex-head each opposite flanks 40. Accordingly, the bolt hex-head 38, upon being tightened, is adapted to be received in the central aperture 60 such that a pair of opposite hex-head side flanks 40 are juxtaposed an associated central aperture internal side edge 64. With reference to FIG. 1, it will be appreciated that each web bore 76 is aligned with an associated base slot 72. Upon a threaded fastener 78 being threaded into each of the web bores, the bolt 37 is fixedly retained by the locking plate against loosening.

Figure 7:
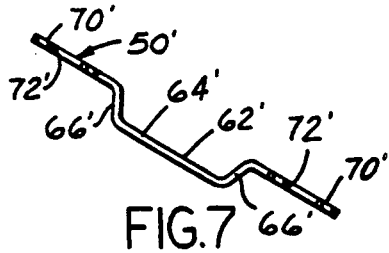
FIG. 7 is a detail cross sectional view of the modified locking retainer taken on the line 7—7 of FIG. 5.
Figure 5:
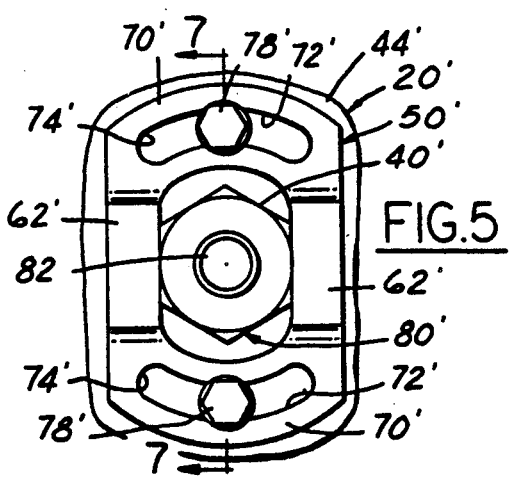
FIG. 5 is a fragmentary view similar to FIG. 1 showing a modified locking retainer secured to a hex nut.
Figure 6:
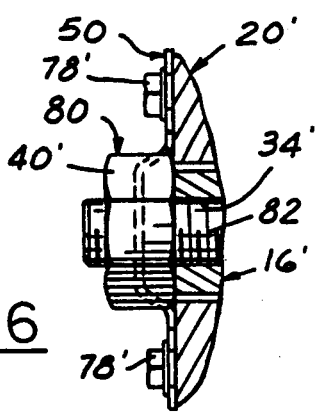
FIG. 6 is a fragmentary vertical sectional view taken on the line 6—6 of FIG. 5.

FIGS. 5, 6 and 7 show a modified form of the invention wherein the same reference numerals are used to designate the same or similar parts with the exception that the reference numerals are primed. It will be seen in FIGS. 5 and 6 that a hex-nut 80 is used to secure a gear 20' on the transmission shaft reduced end 16'. The locking plate 50' is reduced in size to accommodate the hex-nut 80 but in all other respects is identical to the locking plate 50 except that the straps 62' are bent at an increased predetermined dimension from the plane of the locking plate 50' to accommodate the thicker hex-nut 80.

Although only two embodiments of the invention have been illustrated and described, it is apparent that modifications and variations will readily come to mind of a person skilled in the art which modifications and variations do not fall outside the scope of the invention as defined by the following appended claims.

What is claimed is:

1. In a transmission housing shaft gear mounting arrangement used to removably secure a gear on the shaft one free end thereof by means of a bolt, said bolt having a head and a threaded shank engaged in an internally threaded bore formed in the shaft free end and aligned on the principal axis thereof, said head having a plurality of wrench-engagable vertical side flanks, said gear having an outer toothed rim, an intermediate web and a central cylindrical hub extending axially from the web one inner face thereof, said hub formed with an axial through bore adapted for concentric insertion therein of said shaft free end, said hub outer cylindrical surface thereof journally supported in a circular opening in the housing for rotation about said shaft principal axis, said web having the outer surface Thereof formed with a pair of diametrically opposite internally threaded mirror image bores spaced a predetermined dimension from said shaft principal axis, and locking retainer means adapted to prevent loosening of said bolt in said shaft axial bore, said locking retainer means comprising:

a planar generally rectangular-shaped locking plate of rigid sheet steel material having a major longitudinal axis of symmetry defined by longitudinal outer side edges and arcuate mirror image outer end edges, said outer end edges having a common center of curvature located at the midpoint of said longitudinal axis:

said locking plate having a central elongated longitudinally extending aperture, said central aperture having opposed longitudinally extending internal side edges defining two transversely spaced apart pairs of longitudinal side straps bent upwardly a predetermined dimension from the plane of said locking plate;

said central aperture having opposed internal end edges defining longitudinally spaced apart pairs of arcuately shaped end bases, said end bases formed with a pair of arcuate slots, each said slot having curved ends matching the curvature of each web bore, each said slot having a common center of curvature located at said axis midpoint and subtending a central angle of curvature equal to about one sixth of a circle, each said slot having a predetermined radial width equal to the diameter of the web bores;

said central aperture internal side edges spaced a predetermined transverse dimension apart, each said internal side edge having a predetermined longitudinal dimension substantially equal to but slightly greater than each bolt head side flank such that the bolt head is adapted to be received in said central aperture such that a pair of opposite parallel side flanks are adapted to be engaged by an associated central aperture internal side edge so as to be coextensive therewith;

whereby with the bolt being tightened in the shaft axial bore its head is received in said locking plate aperture with a pair of diametrically opposed flanks juxtaposed an associated central aperture internal side edge, each said base slot adapted to be aligned with an associated one of the web bores such that upon a threaded fastener being threadably received in each said base slot and its associated web bore the bolt head being fixedly retained obviating unloosening thereof; and whereby in the event each said base slot not being aligned with an associated web bore the installer removes said locking plate from the head and rotates the locking plate until the head is again received in said central aperture such that its next adjacent pair of opposite flanks are juxtaposed with an associated internal side edge wherein each said base slot being in alignment with an associated web bore enabling a threaded fastener to be threadably engaged therein causing said locking plate to fixedly secure the bolt head.

2. The locking plate as set forth in claim 1, wherein said bolt head is a hex-head having six side flanks.

3. The locking plate as set forth in claim 2; wherein each said base slot subtends a central angle of about 62 degrees.

* * * * *